| (12) | United States Patent<br>Sherry et al. | | (10) Patent No.: US 11,840,354 B2<br>(45) Date of Patent: Dec. 12, 2023 |
|---|---|---|---|

(54) SYSTEMS AND METHODS FOR IMPROVED AIRCRAFT SAFETY

(71) Applicant: GEORGE MASON UNIVERSITY, Fairfax, VA (US)

(72) Inventors: Lance Sherry, Fairfax, VA (US); Oleksandra Snisarevska, Manassas, VA (US)

(73) Assignee: GEORGE MASON UNIVERSITY, Fairfax, VA (US)

(*) Notice: Subject to any disclaimer, the term of this patent is extended or adjusted under 35 U.S.C. 154(b) by 657 days.

(21) Appl. No.: 16/843,538

(22) Filed: Apr. 8, 2020

(65) Prior Publication Data

US 2020/0317365 A1 Oct. 8, 2020

Related U.S. Application Data

(60) Provisional application No. 62/830,711, filed on Apr. 8, 2019.

(51) Int. Cl.
*B64D 43/00* (2006.01)
*G06N 20/00* (2019.01)
*G06N 7/01* (2023.01)

(52) U.S. Cl.
CPC .............. *B64D 43/00* (2013.01); *G06N 7/01* (2023.01); *G06N 20/00* (2019.01)

(58) Field of Classification Search
CPC .. G07C 5/0816; G08G 5/0008; G08G 5/0039; G06N 20/20
See application file for complete search history.

(56) References Cited

U.S. PATENT DOCUMENTS

| 2015/0279218 | A1* | 10/2015 | Irrgang | ................ | G07C 5/0816 |
| | | | | | 701/3 |
| 2015/0338853 | A1* | 11/2015 | Casado Magaña | .. | G08G 5/0043 |
| | | | | | 701/5 |
| 2016/0093221 | A1* | 3/2016 | Bailey | ................. | G08S 51/0039 |
| 2018/0211549 | A1* | 7/2018 | Cohen | .................. | G08G 5/0021 |
| 2018/0307784 | A1* | 10/2018 | Stevens | ................. | G06N 20/20 |
| 2018/0357909 | A1* | 12/2018 | Eyhorn | ................ | G08G 5/0039 |

OTHER PUBLICATIONS

US 10,222,230 B1, 03/2019, Suiter (withdrawn)*

* cited by examiner

*Primary Examiner* — Saba Dagnew
(74) *Attorney, Agent, or Firm* — Ballard Spahr LLP

(57) ABSTRACT

Methods and system for improved aircraft safety are described herein. A machine learning model may be trained using historical flight data for a number of previously flown flights where an automation function autonomously disengaged. The trained machine learning model may be used to generate probabilistic alert rules. The probabilistic alert rules may be used by a computing device onboard an aircraft to provide contextual information to flight crew relating to engagement status for one or more automation functions of the aircraft.

20 Claims, 13 Drawing Sheets

FIG. 2

| Automation Function Configuration | | | | Source of Targets | | Source of Commands | | |
|---|---|---|---|---|---|---|---|---|
| VNAV | LNAV | AP | AT | Alt, Airspeed, ROC/D | Heading/Course | Pitch | Roll | Thrust |
| Eng | Eng | Eng | Eng | MCDU | MCDU | AP | AP | AT |
|  | Eng | Eng | Eng | MCP | MCDU | AP | AP | AT |
| Eng |  | Eng | Eng | MCDU | MCP | AP | AP | AT |
|  |  | Eng | Eng | MCP | MCP | AP | AP | AT |
| Eng | Eng |  | Eng | MCDU | MCDU | S&R | S&R | AT |
|  | Eng |  | Eng | MCP | MCDU | S&R | S&R | AT |
| Eng |  |  | Eng | MCDU | MCP | S&R | S&R | AT |
|  |  |  | Eng | MCP | MCP | S&R | S&R | AT |
| Eng | Eng | Eng |  | MCDU | MCDU | AP | AP | ThL |
|  | Eng | Eng |  | MCP | MCDU | AP | AP | ThL |
| Eng |  | Eng |  | MCDU | MCP | AP | AP | ThL |
|  |  | Eng |  | MCP | MCP | AP | AP | ThL |
| Eng | Eng |  |  | MCDU | MCDU | S&R | S&R | ThL |
|  | Eng |  |  | MCP | MCDU | S&R | S&R | ThL |
| Eng |  |  |  | MCDU | MCP | S&R | S&R | ThL |

FIG. 9A

Departure (900)

| Procedure | COORZ 3 Departure | |
|---|---|---|
| Active Leg | Clb maintain AT or BELOW 5000 at INT | Heading 353° to INT |
| Mode & Target | FLCH 250 knots to 5000' | HDG 353° |
| | PITCH 7.2° | |
| Control Surface Command | CLB THRUST 87% N1 | BANK 0° |

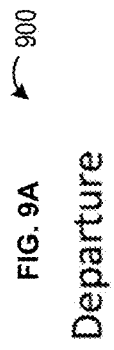
- Flightplan Nav Display
- Tapes, Alt, Speed & FMA
- Flight Directors

FIG. 9B

Cruise (901)

| Procedure | FLUKY.J31.MOL | |
|---|---|---|
| Active Leg | Crz FL370 | Course to Fix SDG |
| Mode & Target | ALT HOLD M0.84 @ FL370 | HDG 353° |
| | PITCH 0.2° | |
| Control Surface Command | 43% N1 – CRZ LIM | BANK 0° |

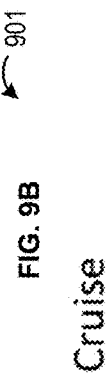
- Flightplan Nav Display
- Tapes, Alt, Speed & FMA
- Flight Directors

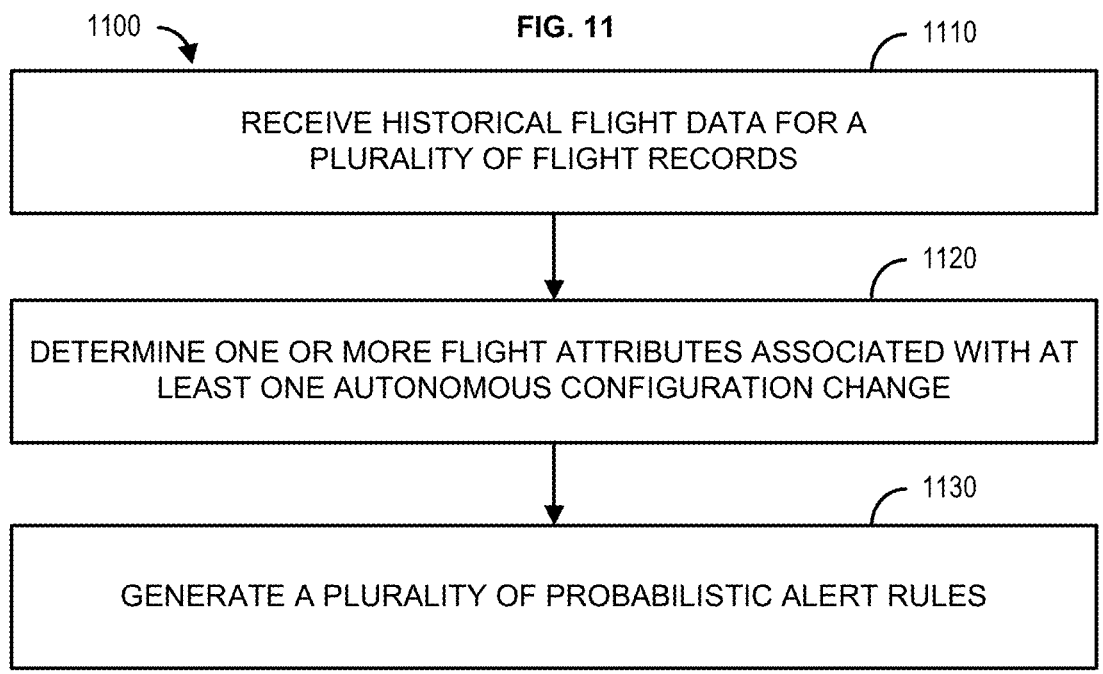

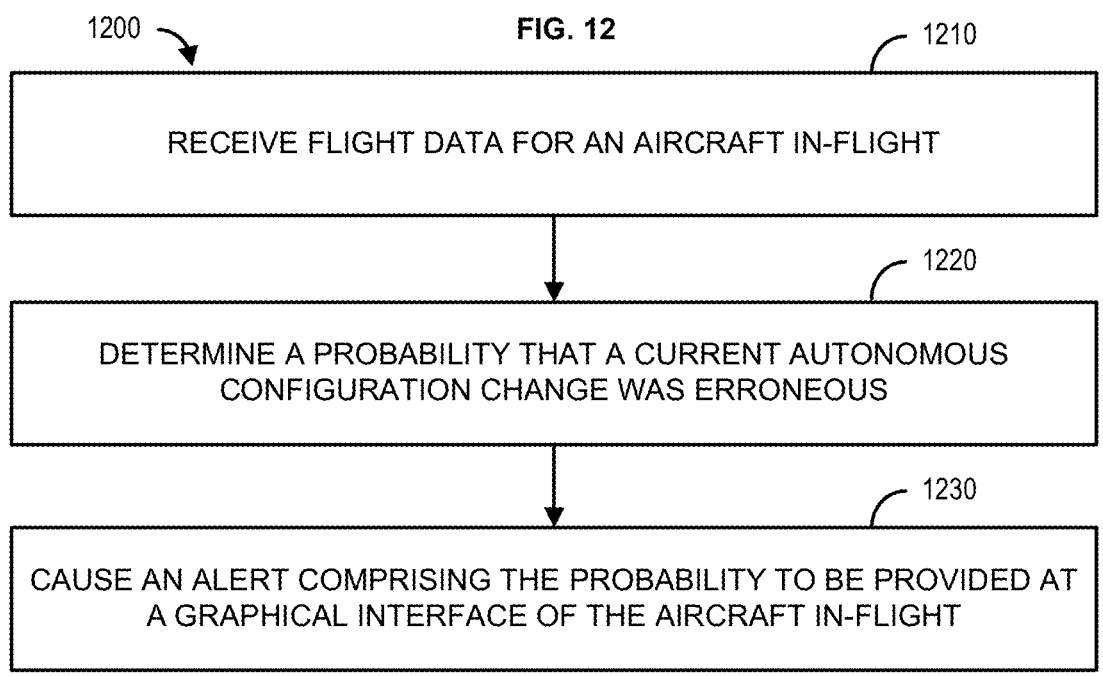

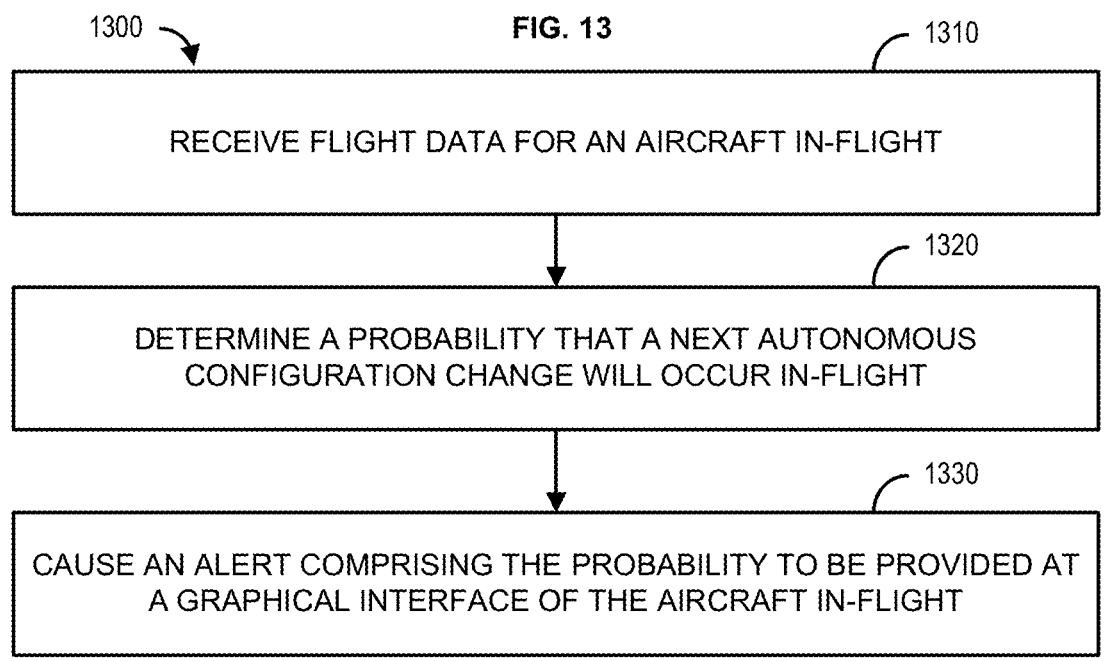

SYSTEMS AND METHODS FOR IMPROVED AIRCRAFT SAFETY

CROSS-REFERENCE TO RELATED PATENT APPLICATION

This application claims priority to U.S. Provisional Application No. 62/830,711, filed on Apr. 8, 2019, the entirety of which is incorporated by reference herein.

STATEMENT REGARDING FEDERALLY SPONSORED RESEARCH

This invention was made with U.S. Government support under grant number NASA NN16AA15C, awarded by the National Aeronautics and Space Administration. The U.S. Government has certain rights in this invention.

BACKGROUND

The evolution of automation on the modern airliner flight deck has resulted in a "stack" of functions that has been incrementally "layered" over time to support the flight crew in performing the mission. The stack includes automation functions for instantaneous control of aerodynamic control surfaces and engines as well as for tactical control of the trajectory and for strategic flight plan path management and optimization. By engaging/disengaging these automation functions, there are up to sixteen combinations of automation function configurations that can be engaged at any time.

Due to the evolutionary development of the flight deck, the engagement status of the combination of functions is annunciated in an ad-hoc, distributed fashion across the flight deck displays. There is no single display of the consolidated automation function configuration. Further, existing systems for displaying information regarding the various automation functions do not account for historical flight data where an anomalous automation disengagement resulted in a safety incident. Thus, there is a need for improved systems and methods for providing flight crew with sufficient safety-related information regarding the various automation functions in an efficient, organized manner. Therefore, it is an object of the invention to provide computer-implemented systems and methods that use machine learning to improve aircraft safety in-flight.

SUMMARY

It is to be understood that both the following general description and the following detailed description are exemplary and explanatory only and are not restrictive. Analysis of accident scenarios for Controlled Flight into Stall (CFIS) accidents identified a category of accident in which an automation function (e.g. Autothrottle) autonomously disengaged without flight crew action. This resulted in the automation flying the aircraft into an aerodynamic stall. Without salient notification of the engagement status change, the flight crew's ability to mitigate the scenario in a timely manner was curtailed. Accordingly, provided herein are systems and methods to improve aircraft safety in-flight.

The present methods and systems may be used to provide flight crew with a single synoptic display of the consolidated automation function configuration status. The synoptic display may appear when a configuration change occurs, otherwise the synoptic display may remain hidden. As an example, a computing device may be used to receive and analyze historical flight data for a group of previous flights. The historical flight data may be a number of flight records, each having one or more flight attributes for the particular flight. Each of the previous flights may be associated with at least one autonomous configuration change that occurred during the flight (e.g., an engagement or a disengagement of at least one automation function). The computing device may utilize one or more machine learning models/algorithms to determine which flight attributes are most closely associated with the at least one autonomous configuration change. Using those closely associated flight attributes, the computing device may generate a set of probabilistic alert rules.

A computing device onboard an aircraft may use the set of probabilistic alert rules to provide the flight crew of the aircraft with information regarding various automation functions in an efficient, organized manner at a synoptic display (e.g., a graphical interface of the aircraft). For example, the computing device may receive flight data from the aircraft, which may include one more current flight attributes and an indication of a current autonomous configuration change. Using the flight data and the set of probabilistic alert rules, the computing device may determine a probability. For example, the probability may be indicative of a level of confidence that the current autonomous configuration change was erroneous. As another example, the probability may be indicative of a level of confidence that a next autonomous configuration change will occur in-flight. The computing device may cause the probability and an indication of the current autonomous configuration change to be displayed at the synoptic display.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 2 shows an example data table;
FIG. 9 shows an example interface;
FIG. 11 shows a flowchart for an example method;
FIG. 12 shows a flowchart for an example method;
and
FIG. 13 shows a flowchart for an example method.

DETAILED DESCRIPTION

Figure 1:
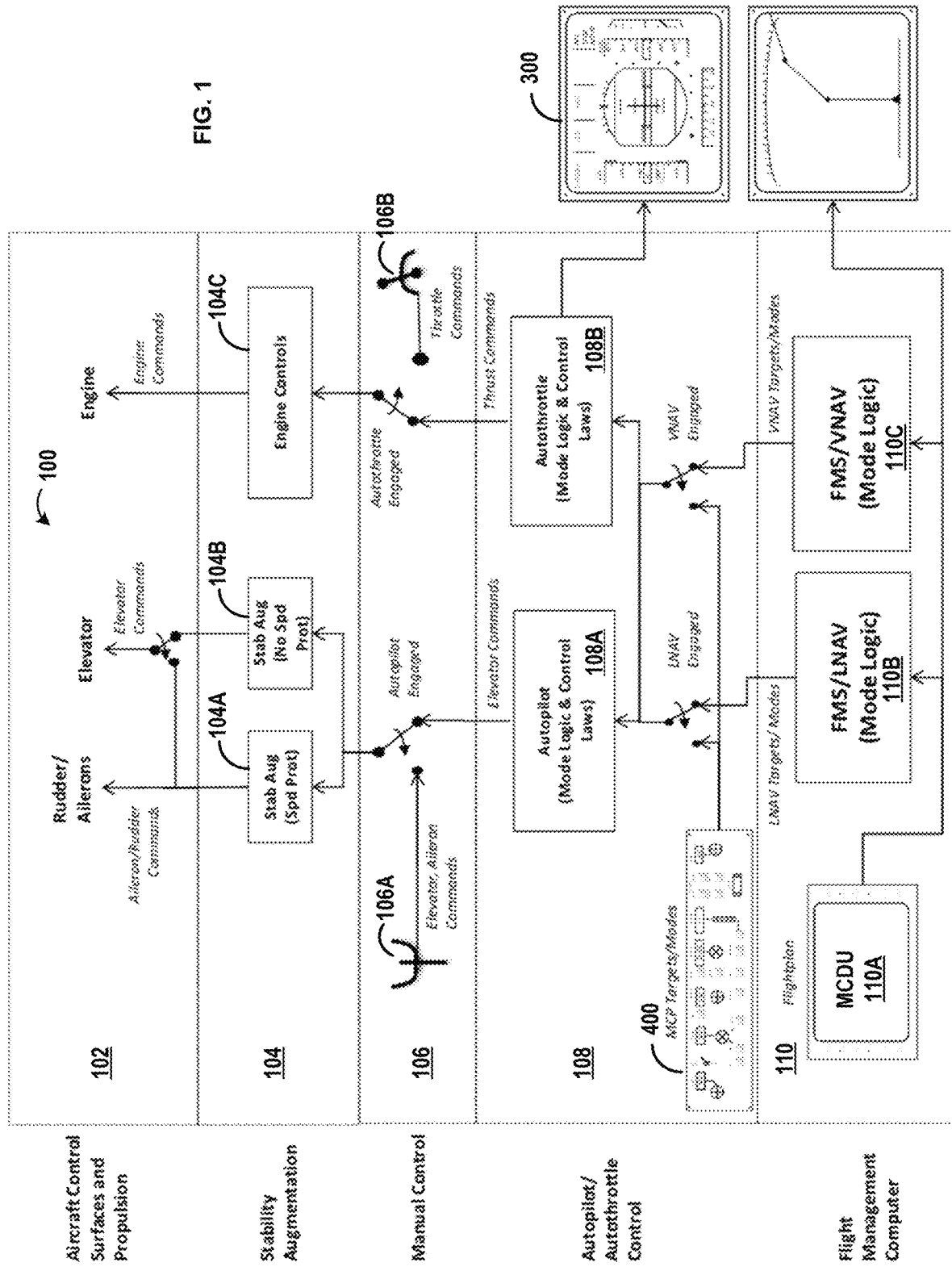
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Provided herein are methods and systems for improved aircraft safety. The dominant category of aircraft accidents are classified as Loss of Control (LOC) accidents. Within the LOC category is a class of accidents classified as Controlled Flight into Stall (CFIS). CFIS accidents are characterized by aircraft that experience an aerodynamic stall with a mechanically, electronically, structurally sound aircraft. Within the CFIS category there are two sub-categories of CFIS accidents. The first sub-category is called "No Active Speed Control." In No Active Speed Control cases, the automation is coupled but no longer actively commands controls to the airspeed target, and the selected guidance/control mode does not actively control to the airspeed target. Examples include "dormant throttles" and "land mode." The second sub-category is called "Silent Decoupling of Automation" (e.g., disengagement), which result in no active speed control. Examples include silent "Autothrottle disconnects." There are also accident scenarios in which the automated airspeed protection (also known as Alpha-floor) is autonomously turned off. The present methods and systems enable mitigation of "silent" disengagement of automation functions, whereby a configuration of the automation functions on the flight deck results in no active speed control.

The flight deck of a modern airliner is a "human-machine system" having responsibility for managing the mission including, but not limited to, the management of aircraft trajectory from origin to destination. This function, performed by various combinations of flight crew and automation functions, coordinates movement of aircraft control surfaces and propulsion to achieve a sequence of target altitudes, speeds, and headings that constitute the segments of the departure, enroute, arrival, and approach procedures in a mission flight plan. The combination of control surfaces and engine controls are adjusted in a coordinated manner to maintain aerodynamic lift and thrust (e.g., energy) for the desired trajectory defined by target altitude, speed, and heading. The combination of target altitudes, speeds, and headings are coordinated to meet the requirements of the active leg of the flight plan or air traffic control instruction.

An active leg of a flight plan is based on a flight plan that includes navigation procedures (e.g. SIDs, airways, STAR, Approach, etc.), airspace restrictions due to traffic and weather, traffic separation, and other safety, traffic flow management, and business considerations. The flight crew are responsible for the overall conduct of the flight including the (a) mission flight plan, (b) targets and control modes for each segment of the flight plan, and (c) control surface/propulsion commands for each target control mode combination. Each of the flight crew tasks is supported by flight deck automation functions and their associated displays that have evolved over time. The evolution has resulted in the "stacking" of functions that is found in the modern airliner, as shown in the system 100 of FIG. 1.

The system 100 may include stability augmentation 104 and engine control for instantaneous control of control surfaces and engines 102. The system 100 may also include tactical control of a trajectory to the targets. Further, the system 100 may include strategic flight plan path management 110 through automated selection of the targets and control modes. The system 100 may have two alternate sources of targets and control modes, and two alternate sources of elevator, aileron/rudder, and thrust commands.

The system 100 may include a Flight Management System (FMS) 110 that provides a means to define the flight plan and provides calculations for optimum speeds and route of flight to achieve fuel-burn, time of arrival, and time-enroute objectives. The flight crew may interact with the FMS 110 functions through a Multi-function Control and Display Unit (MCDU) 110A and can visualize the flight plan on the Navigation Display 300, which is described further with respect to FIG. 3. The FMS 110 may automatically select appropriate targets and control modes based on a current aircraft position relative to the targets required for the current flight plan segment. The automatic selection of altitude and speed targets, as well as pitch and thrust control modes, is known as Vertical Navigation or VNAV 110C. The automatic selection of heading/course targets, as well as roll control modes, is known as Lateral Navigation or LNAV 110B.

Figure 4:
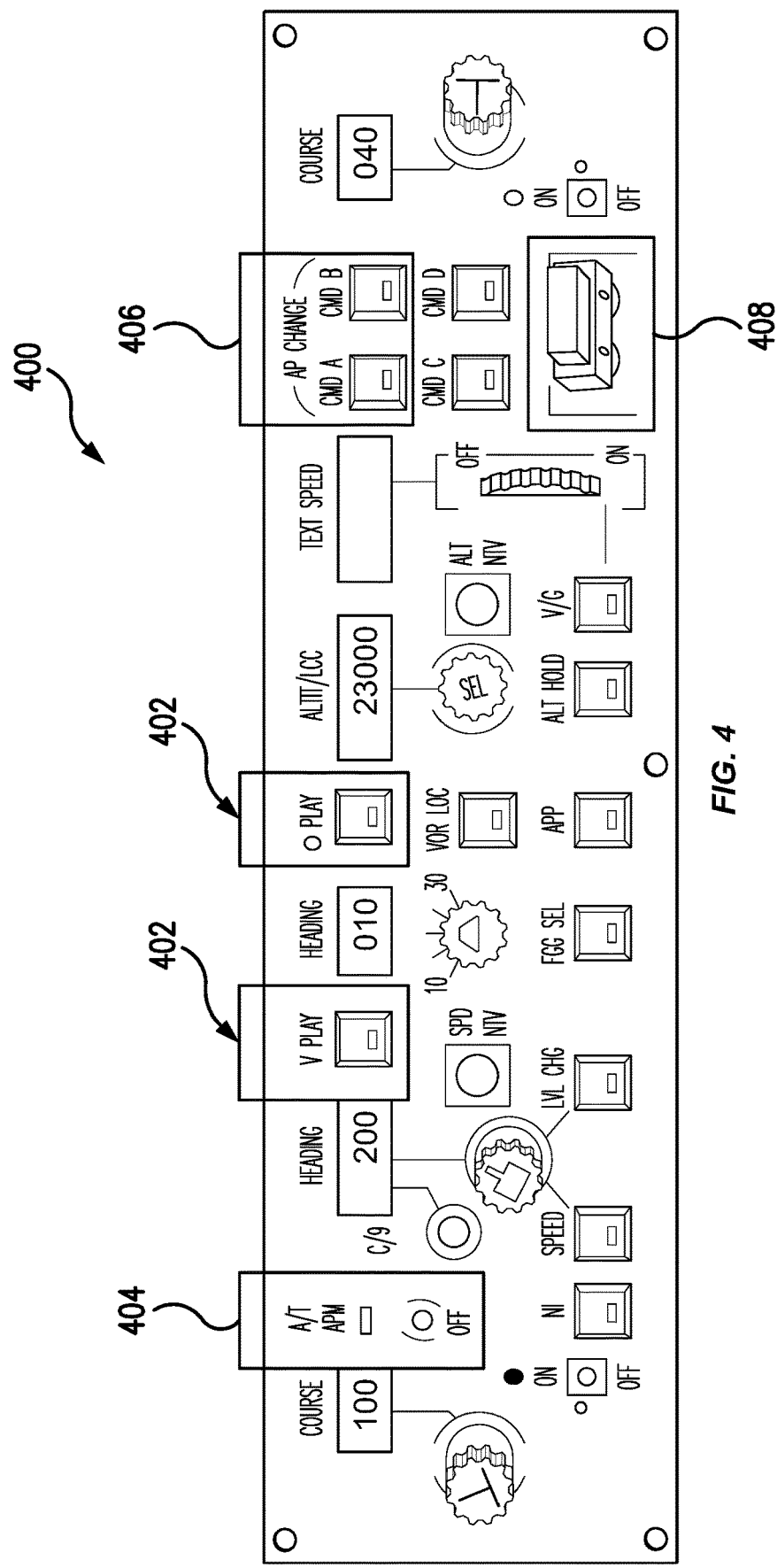
FIG. 4 shows an example system component.

Another source of targets and control modes is a Mode Control Panel (MCP) 400, which is described further with respect to FIG. 4. The flight crew may select altitude, vertical speed, airspeed and heading/course targets directly via knobs and wheels of the MCP 400. The flight-crew may also select a control mode via push-buttons on the MCP 400. When the flight crew select targets and modes on the MCP 400, it is fair to say they are following a flight plan or navigation procedure, albeit not the exact flight plan in the FMS 110.

The flight crew may determine whether to fly the VNAV 110C or LNAV 110B targets and control modes or to use the MCP 400 selected targets and control modes by selecting the VNAV 110C and/or LNAV 110B buttons on the MCP 400. When VNAV 110C and/or LNAV 110B buttons are not selected, the targets and control modes may come from the MCP 400, otherwise from the FMS 110. VNAV 110C and LNAV 110B may also be known as PROF/NAV on some aircraft and may represent "mega-modes," as they automatically select control-modes for pitch, roll, and thrust.

An Autopilot 108A and/or Autothrottle 108B of an Autopilot/Autothrottle Control system 108 may convert targets from the FMS 110 or MCP 400 into commands to the control surfaces 102 (e.g. elevators, ailerons, and rudder) and to the propulsion system such that the aircraft achieves the specified targets. These commands may be coordinated in such a way that the aircraft maintains aerodynamic stability and remains within the safe operation regime at all times with passenger comfort considerations. An alternate source of commands is via a side-stick/yoke 106A and a throttle lever 106B of a manual control system 106. When the flight crew command pitch, roll, and thrust using the stick 106A and the throttle lever 106B, it is fair to say they are following a flight plan or navigation procedure, and maintaining aerodynamic stability, albeit not the exact flight plan in the FMS 110 or by the same energy strategy in the Autopilot/Autothrottle control system 108.

The status of the Autopilot 108A and Autothrottle 108B engaged switches determine the source of commands. The propulsion and control-surface 102 commands are converted to actuator commands by Flight Control & Stability Augmentation and Full Authority Digital Engine Control systems 104A, 104B, 104C. These systems compensate for non-linearity in aerodynamics and engine performance.

The FMS 110 targets and control modes may be used by the Autopilot 108A when the VNAV 110C and/or LNAV 110B mega-modes are selected. When VNAV 110C and/or LNAV 110B are engaged with the flight planning, guidance, and control, the automation functions are considered to be in a "managed" configuration state. When VNAV 110C and/or LNAV 110B are no longer selected, the Autopilot 108A may use the targets and control modes from the MCP 400. When the Autopilot 108A and/or the Autothrottle 108B are no longer selected, the Engine Controls and Stability Augmentation system 104 may use the commands from the stick 106A and the throttle lever 106B. Accordingly, a total of 16 possible automation configurations of the LNAV 110B, VNAV 110A, Autopilot 108A, and Autothrottle 108B are possible, as shown in the example data table of FIG. 2.

Figure 3:
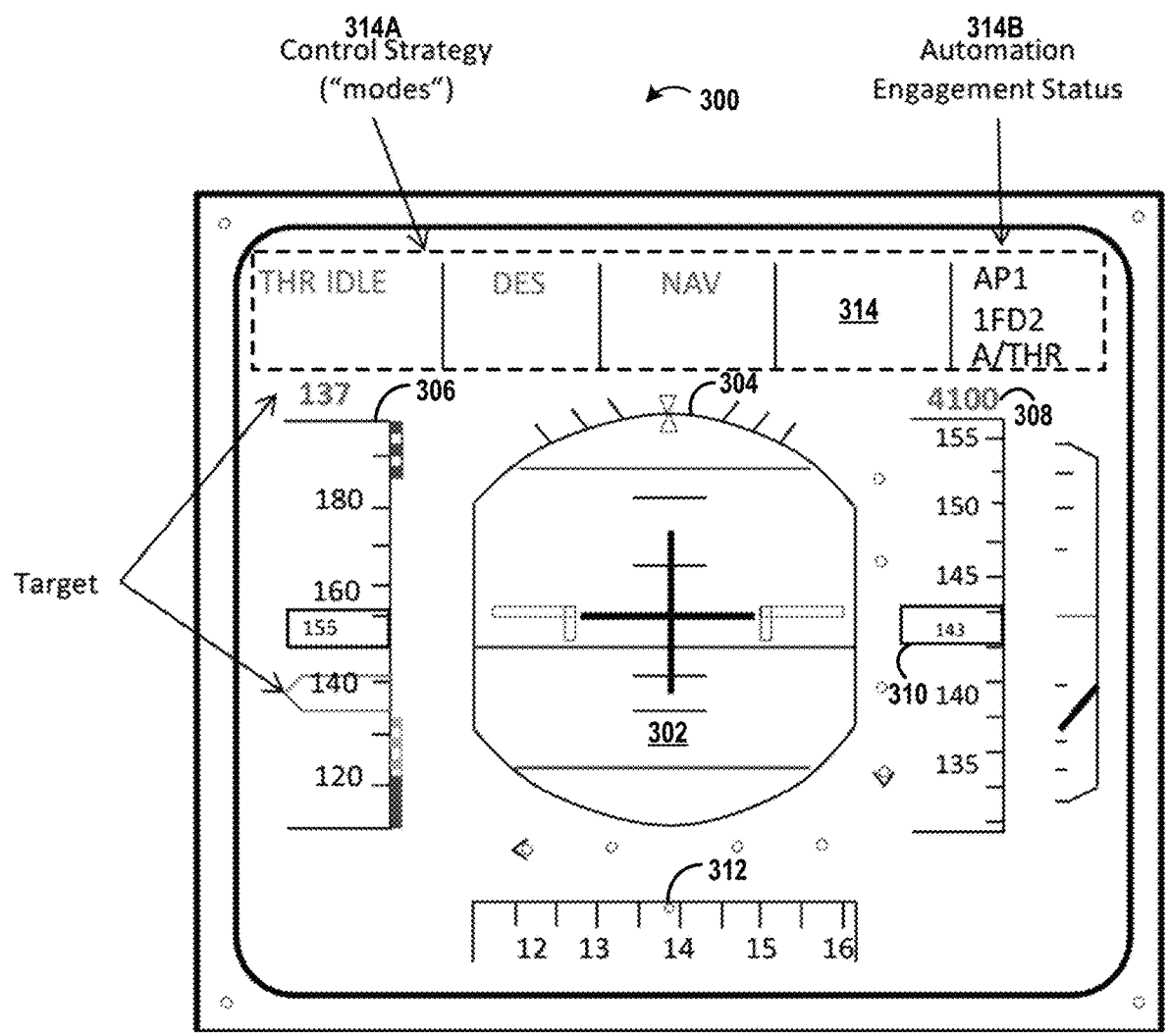
FIG. 3 shows an example system component.

The incremental evolution of flight deck automation functions over time is reflected in the fact that most current flight deck user-interfaces do not reflect the functional architecture (e.g., the stack). Additionally, most of the current flight deck user-interfaces do not have a single synoptic display of consolidated automation function configuration information. For the flight crew, the primary source of information on an aircraft is the Primary Flight Display (PFD) 300, as shown in FIG. 3. Most modern "glass" PFDs 300 are an integrated version of federated "steam gauge" displays used in older aircraft that used one gauge for each parameter. Information about the automation function engagement status, targets, and modes has been layered into the modern PFD 300. Many features of the PFD 300 were designed prior to the evolution of automation systems and were not explicitly designed to support tasks associated with monitoring complex automation for inappropriate commands.

The PFD 300 may be organized as follows: A center section of the PFD 300 may be an attitude indicator (AI) 302. The top of the AI 302 may have a bank indicator 304. To the left of the AI 302 may be an airspeed tape 306. To the right of the AI 302 may be an altitude tape 308 and a vertical speed indicator 310. Below the AI 302 may be a partial compass rose 312 that displays the aircraft heading. Above the AI 302 may be a Flight Mode Annunciator (FMA) 314. The FMA 314 may display control modes for each of roll, pitch, and thrust axis. The FMA 314 may also display a status of the Autopilot 108A and Autothrottle 108B. Some FMAs 314 use labels to indicate VNAV 110C and LNAV 110B status (e.g. VNAV-PATH). Other FMAs 314 use color codes to indicate VNAV 110C and LNAV 110B engagement (e.g., using a magenta color code). The PFD 300 may not explicitly display whether an automation function is controlling the targets, and labels displayed on the FMA 300 may sometimes appear ambiguous. These issues may have contributed to several CFIS incidents and accidents in the past.

Turning now to FIG. 4, the MCP 400 is shown. The MCP 400 may be the input device for pilot manual selection of the targets and modes, as well as for coupling (e.g., engaging) the automation functions. The MCP 400 may not provide a visual indication of the automation "stack" or a consolidated status of the automation configuration. As shown in FIG. 4, the MCP 400 essentially hides the "stack" architecture with LNAV and VNAV buttons 402 at a same "level" as mode buttons and A/T and A/P engagement switches 404, 406, 408.

In several recent accidents and incidents, structurally, mechanically, and electronically sound commercial airliners decelerated through the minimum safe operating speed to a "stick-shaker" stall speed. Each of these CFIS accidents and incidents followed a unique sequence of events. However, the sequence of events exhibited a general pattern in which: (1) a triggering event (e.g., sensor discrepancy, and/or erroneous flight crew entry) resulted in (2) an effect on the automation system (e.g., a mode change, a change in automation function engagement status, and/or an inappropriate target), that led to (3) an inappropriate automation command that in turn, (4) resulted in a speed envelope violation. In each of these cases, the flight crew was not able to intervene in a timely manner because (1) the triggering event was not annunciated or, if it was annunciated, the consequences of the triggering event were ambiguous, (2) the changes in the automation states were not explicitly annunciated on the flight deck, (3) the inappropriate command was not salient, and (4) the resulting deceleration was masked by an appropriate trajectory maneuvers. In several cases, the automation function at issue autonomously disengaged, thereby no longer coupling the automation commands to the control surfaces and engines of the aircraft.

The VNAV, LNAV, Autopilot (A/P), and Autothrottle (A/T) statuses are typically indicated on the push-buttons on the MCP 400. In some MCP 400 designs, the position of a toggle switch also indicates the status of the A/P. The main source of flight deck automation function configuration status is the PFD 300. There are several designs of PFDs 300 but in some form they all display the A/P and A/T status as labels, and the VNAV, LNAV status as either labels (e.g. VNAV-PTH), or by color (e.g. magenta for VNAV, LNAV). In some flight deck designs, disengagement of the A/P and/or the A/T results in a Caution/Warning indicator that may only be extinguished by the flight crew action of pressing a Caution/Warning button. In modern glass flight decks, a number of error messages associated with disengagement of the A/P and/or the A/T may also appear on a synoptic display.

Figure 8:
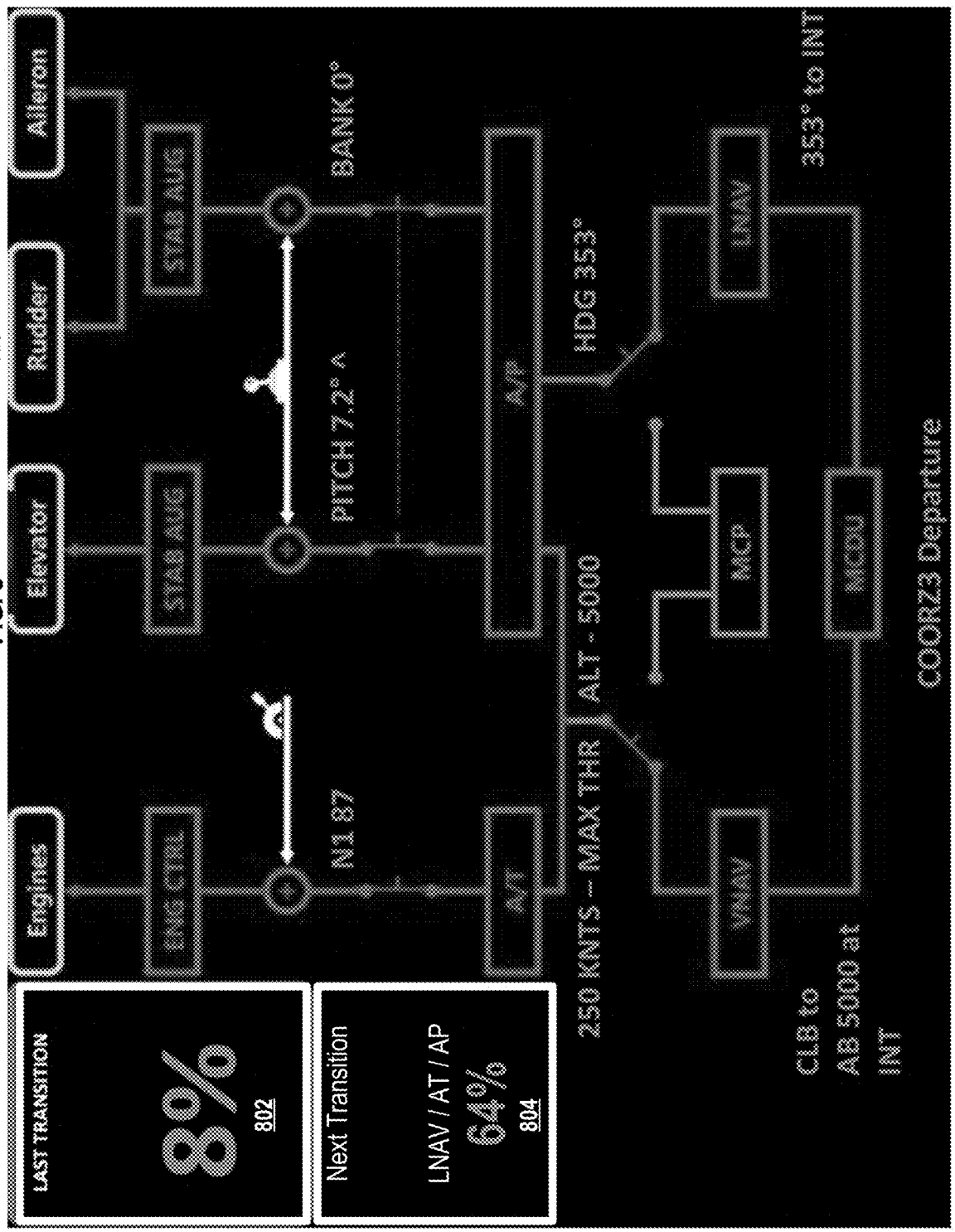
FIG. 8 shows an example interface.

To address the shortcomings of existing PFD 300 and MCP 400 designs, the present methods and systems may be used in an Automation Function Configuration (AFC) display, which is further described herein with respect to FIG. 8. The AFC display may provide flight crew with a single synoptic display of consolidated automation function configuration statuses. The AFC may identify a status of a source of targets and control modes for Lateral and Vertical (including speed) trajectories. The AFC may provide the status in one location (e.g., not distributed across the flight deck). The AFC may provide visual, aural, and/or haptic cues to the flight crew. The AFC may identify manual selection and deselection as well as autonomous deselection of automation functions. The AFC may identify unlikely combinations of automation function configuration (e.g., anomalous configurations based on historical flight data). The AFC may display the source of the targets and control modes for LNAV, VNAV, A/P, A/T and Stability Augmentation (Speed Protection). The AFC may further identify sources that are not used. Additionally, the AFC may indicate a configuration status change(s) that was not a result of flight crew interaction with the automation functions (e.g., an autonomous disengagement/engagement of an automation function).

In order to enable the AFC to provide contextually useful information, a computing device in communication with the AFC (e.g., an onboard flight computer) may use one or more probabilistic alert rules. The one or more probabilistic alert rules may be a result of applying one or more machine learning models and/or algorithms to a plurality of flight records (e.g., historical flight data). Machine learning is a subfield of computer science that gives computers the ability to learn without being explicitly programmed. Machine learning platforms include, but are not limited to, naïve Bayes classifiers, support vector machines, decision trees, neural networks, and the like.

For example, a computing device may be used to receive and analyze historical flight data for a group of previous flights using one or more machine learning models and/or algorithms. The historical flight data may be a number of flight records, each having one or more flight attributes for a particular flight. Each of the previous flights may be associated with at least one autonomous configuration change that occurred during the flight (e.g., an engagement or a disengagement of at least one automation function). The computing device may utilize the one or more machine learning models and/or algorithms to determine which flight attributes are most closely associated with the at least one autonomous configuration change. Using those closely associated flight attributes, the computing device may generate a predictive model. The predictive model (e.g., a machine learning classifier) may be generated to classify an autonomous configuration change as anomalous or non-anomalous based on analyzing flight data associated with the autonomous configuration change.

Figure 5:
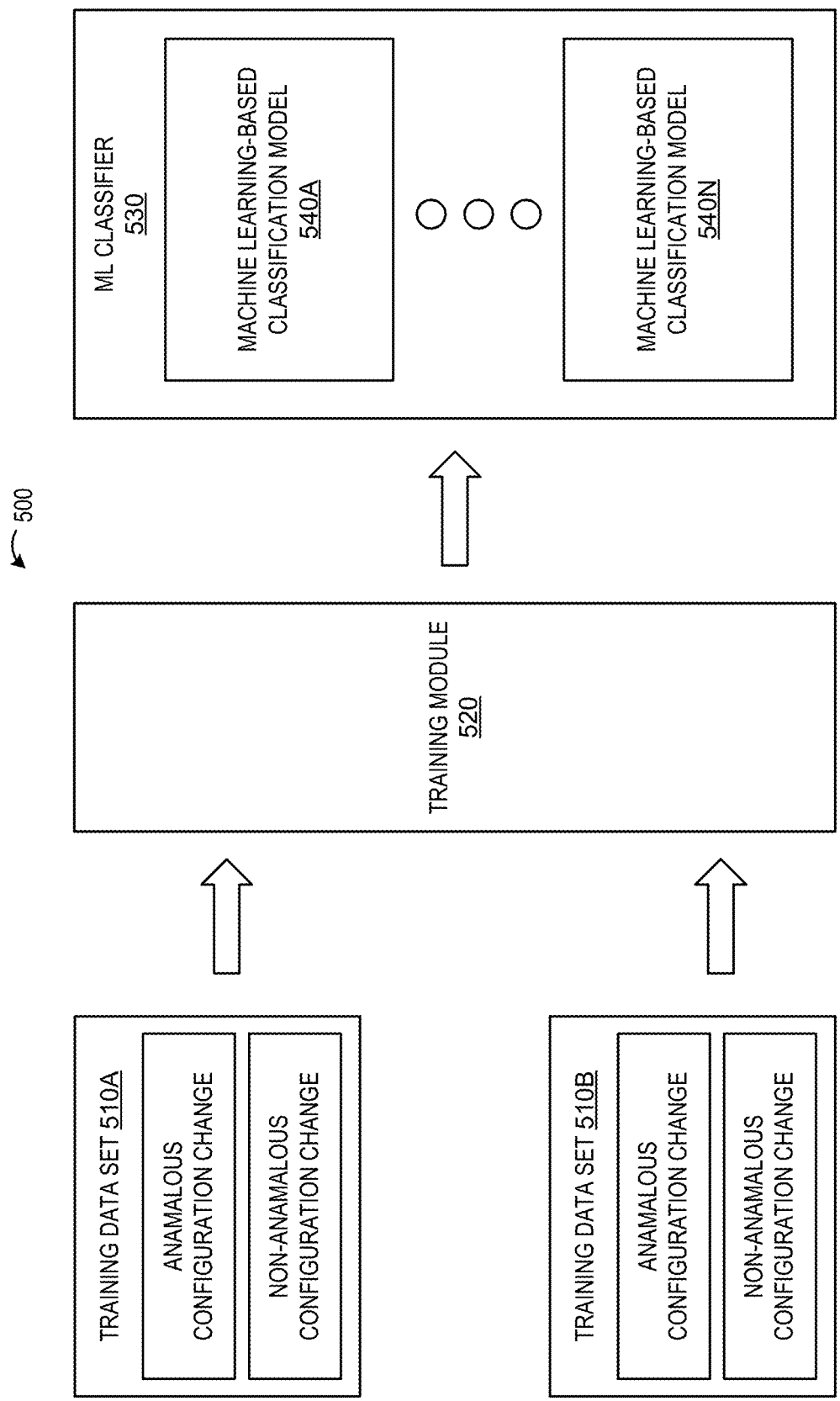
FIG. 5 shows an example machine learning system.

As shown in FIG. 5, a system 500 is described herein that is configured to use machine learning techniques to train, based on an analysis of one or more training data sets 510A-210B by a training module 520, at least one machine learning-based classifier 530 that is configured to classify an autonomous configuration changes as being anomalous or non-anomalous. The training data set 510A (e.g., the first subset of historical flight data) may comprise labeled autonomous configuration changes (e.g., labeled as being anomalous). The training data set 510B (e.g., the second subset of historical flight data) may also comprise labeled autonomous configuration changes (e.g., labeled as being non-anomalous). The labels may comprise anomalous and non-anomalous.

The second subset of historical flight data may be randomly assigned to the training data set 510B or to a testing data set. In some implementations, the assignment of data to a training data set or a testing data set may not be completely random. In this case, one or more criteria may be used during the assignment, such as ensuring that similar numbers of historical flight records with different labels are in each of the training and testing data sets. In general, any suitable method may be used to assign the data to the training or testing data sets, while ensuring that the distributions of anomalous and non-anomalous labels are somewhat similar in the training data set and the testing data set.

The training module 520 may train the machine learning-based classifier 530 by extracting a feature set from the first subset of historical flight data (e.g., labeled as being anomalous) in the training data set 510A according to one or more feature selection techniques. The training module 520 may further define the feature set obtained from the training data set 510A by applying one or more feature selection techniques to the second subset of historical flight data (e.g., labeled as being non-anomalous) in the training data set 510B that includes statistically significant features of positive examples (e.g., anomalous) and statistically significant features of negative examples (e.g., labeled as being non-anomalous). The training module 520 may train the machine learning-based classifier 530 by extracting a feature set from the training data set 510B that includes statistically significant features of positive examples (e.g., anomalous) and statistically significant features of negative examples (e.g., non-anomalous).

The training module 520 may extract a feature set from the training data set 510A and/or the training data set 510B in a variety of ways. The training module 520 may perform feature extraction multiple times, each time using a different feature-extraction technique. In an embodiment, the feature sets generated using the different techniques may each be used to generate different machine learning-based classification models 540. For example, the feature set with the highest quality metrics may be selected for use in training. The training module 520 may use the feature set(s) to build one or more machine learning-based classification models 540A-240N that are configured to indicate whether or not new data is associated with an anomalous or a non-anomalous autonomous configuration change(s).

The training data set 510A and/or the training data set 510B may be analyzed to determine any dependencies, associations, and/or correlations between flight attributes and the anomalous/non-anomalous labels in the training data set 510A and/or the training data set 510B. The identified correlations may have the form of a list of flight attributes that are associated with different anomalous/non-anomalous labels. The flight attributes may be considered as features (or variables) in the machine learning context. The term "feature," as used herein, may refer to any characteristic of an item of data that may be used to determine whether the item of data falls within one or more specific categories. By way of example, the features described herein may comprise one or more flight attributes. The one or more flight attributes may include an altitude, an airspeed, a groundspeed, an amount of pitch, a level of thrust, a phase of flight, a command(s), a target(s), VNAV data, LNAV data, a pilot selection(s) a combination thereof and/or the like.

A feature selection technique may comprise one or more feature selection rules. The one or more feature selection rules may comprise a flight attribute occurrence rule. The flight attribute occurrence rule may comprise determining which flight attributes in the training data set 510A occur over a threshold number of times and identifying those flight attributes that satisfy the threshold as candidate features. For example, any flight attributes that appear greater than or equal to 5 times in the training data set 510A may be considered as candidate features. Any flight attributes appearing less than 5 times may be excluded from consideration as a feature.

A single feature selection rule may be applied to select features or multiple feature selection rules may be applied to select features. The feature selection rules may be applied in a cascading fashion, with the feature selection rules being applied in a specific order and applied to the results of the previous rule. For example, the flight attribute occurrence rule may be applied to the training data set 510A to generate a first list of flight attributes. A final list of candidate flight attributes may be analyzed according to additional feature selection techniques to determine one or more candidate flight attribute groups (e.g., groups of flight attributes that may be used to predict whether an autonomous configuration change is anomalous or non-anomalous). Any suitable computational technique may be used to identify the candidate flight attribute groups using any feature selection technique such as filter, wrapper, and/or embedded methods. One or more candidate flight attribute groups may be selected according to a filter method. Filter methods include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable (e.g., anomalous/non-anomalous).

As another example, one or more candidate flight attribute groups may be selected according to a wrapper method. A wrapper method may be configured to use a subset of features and train a machine learning model using the subset of features. Based on the inferences that drawn from a previous model, features may be added and/or deleted from the subset. Wrapper methods include, for example, forward feature selection, backward feature elimination, recursive feature elimination, combinations thereof, and the like. In an embodiment, forward feature selection may be used to identify one or more candidate flight attribute groups. Forward feature selection is an iterative method that begins with no feature in the machine learning model. In each iteration, the feature which best improves the model is added until an addition of a new variable does not improve the performance of the machine learning model. In an embodiment, backward elimination may be used to identify one or more candidate flight attribute groups. Backward elimination is an iterative method that begins with all features in the machine learning model. In each iteration, the least significant feature is removed until no improvement is observed on removal of features. Recursive feature elimination may be used to identify one or more candidate flight attribute groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate flight attribute groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 520 has generated a feature set(s), the training module 520 may generate a machine learning-based classification model 540 based on the feature set(s). A machine learning-based classification model may refer to a complex mathematical model for data classification that is generated using machine-learning techniques. In one example, this machine learning-based classifier may include a map of support vectors that represent boundary features. By way of example, boundary features may be selected from, and/or represent the highest-ranked features in, a feature set.

The training module 520 may use the feature sets extracted from the training data set 510A and/or the training data set 510B to build a machine learning-based classification model 540A-240N for each classification category (e.g., anomalous, non-anomalous). In some examples, the machine learning-based classification models 540A-240N may be combined into a single machine learning-based classification model 540. Similarly, the machine learning-based classifier 530 may represent a single classifier containing a single or a plurality of machine learning-based classification models 540 and/or multiple classifiers containing a single or a plurality of machine learning-based classification models 540.

The extracted features (e.g., one or more candidate flight attributes) may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 530 may comprise a decision rule or a mapping that each candidate flight attribute to assign an autonomous configuration change to a class (anomalous, non-anomalous).

The candidate flight attribute and the machine learning-based classifier 530 may be used to predict the anomalous/non-anomalous statuses of the test flight records in the testing data set. In one example, the result for each test flight record includes a confidence level that corresponds to a likelihood or a probability that the corresponding test record belongs in the predicted anomalous/non-anomalous status. The confidence level may be a value between zero and one, and it may represent a likelihood that the corresponding test flight record belongs to an anomalous/non-anomalous status. In one example, when there are two statuses (e.g., anomalous and non-anomalous), the confidence level may correspond to a value p, which refers to a likelihood that a particular test flight record belongs to the first status (e.g., anomalous). In this case, the value 1-p may refer to a likelihood that the particular test flight record belongs to the second status (e.g., non-anomalous). In general, multiple confidence levels may be provided for each test flight record and for each candidate flight attribute when there are more than two statuses. A top performing candidate flight attribute may be determined by comparing the result obtained for each test flight record with the known anomalous/non-anomalous status for each test flight record. In general, the top performing candidate flight attribute will have results that closely match the known anomalous/non-anomalous statuses.

The top performing candidate flight attribute may be used to predict the anomalous/non-anomalous status of an autonomous configuration change. For example, flight data associated with an autonomous configuration change may be determined/received. The flight data may be provided to the machine learning-based classifier 530 which may, based on the top performing candidate flight attribute, classify the autonomous configuration change as being anomalous or as being non-anomalous.

Figure 6:
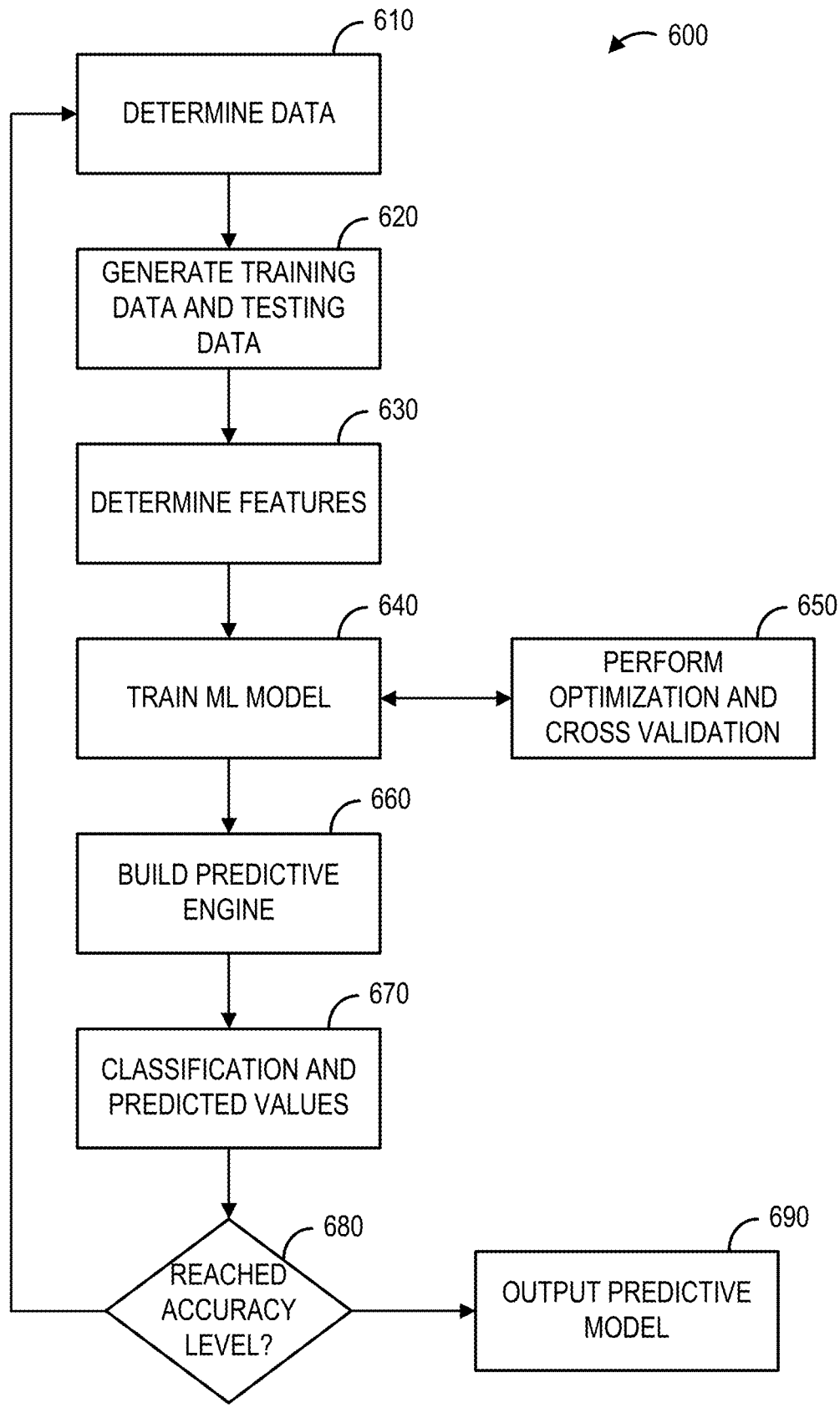
FIG. 6 shows an example process flowchart.

FIG. 6 is a flowchart illustrating an example training method 600 for generating the machine learning-based classifier 530 using the training module 520. The training module 520 can implement supervised, unsupervised, and/or semi-supervised (e.g., reinforcement based) machine learning-based classification models 540. The method 600 illustrated in FIG. 6 is an example of a supervised learning method; variations of this example of training method are discussed below, however, other training methods can be analogously implemented to train unsupervised and/or semi-supervised machine learning models.

The training method 600 may determine (e.g., access, receive, retrieve, etc.) first historical flight data (e.g., historical flight records) and second historical flight data (e.g., historical flight records) at step 610. The first historical flight data and the second historical flight data may each contain one or more datasets, and each dataset may be associated with a particular aircraft or class of aircraft. Each aircraft may or may not include a same "stack" of automation functions and may or may not be associated with a same, or different, type of safety incident (e.g., a CFIS incident). Each dataset may include a labeled list of autonomous configuration changes. The labels may comprise anomalous or non-anomalous.

The training method 600 may generate, at step 620, a training data set and a testing data set. The training data set and the testing data set may be generated by randomly assigning labeled autonomous configuration changes of individual flight records from the second historical flight data to either the training data set or the testing data set. In some implementations, the assignment of flight records as training or test samples may not be completely random. In an embodiment, only the labeled autonomous configuration changes for a specific type and/or class of aircraft may be used to generate the training data set and the testing data set. In an embodiment, a majority of the labeled autonomous configuration changes for the specific type and/or class of aircraft may be used to generate the training data set. For example, 75% of the labeled autonomous configuration changes for the specific type and/or class of aircraft may be used to generate the training data set and 25% may be used to generate the testing data set.

The training method 600 may determine (e.g., extract, select, etc.), at step 630, one or more features that can be used by, for example, a classifier to differentiate among different classifications (e.g., anomalous vs. non-anomalous). The one or more features may comprise a set of flight attributes. In an embodiment, the training method 600 may determine a set features from the first historical flight data. In another embodiment, the training method 600 may determine a set of features from the second historical flight data. In a further embodiment, a set of features may be determined from labeled autonomous configuration changes from a type and/or class of aircraft different than the type and/or class of aircraft associated with the labeled autonomous configuration changes of the training data set and the testing data set. In other words, labeled autonomous configuration changes from the different type and/or class of aircraft may be used for feature determination, rather than for training a machine learning model. The training data set may be used in conjunction with the labeled autonomous configuration changes from the different type and/or class of aircraft to determine the one or more features. The labeled autonomous configuration changes from the different type and/or class of aircraft may be used to determine an initial set of features, which may be further reduced using the training data set.

The training method 600 may train one or more machine learning models using the one or more features at step 640. In one embodiment, the machine learning models may be trained using supervised learning. In another embodiment, other machine learning techniques may be employed, including unsupervised learning and semi-supervised. The machine learning models trained at 640 may be selected based on different criteria depending on the problem to be solved and/or data available in the training data set. For example, machine learning classifiers can suffer from different degrees of bias. Accordingly, more than one machine learning models can be trained at 640, optimized, improved, and cross-validated at step 650.

The training method 600 may select one or more machine learning models to build a predictive model at 660 (e.g., a machine learning classifier). The predictive model may be evaluated using the testing data set. The predictive model may analyze the testing data set and generate classification values and/or predicted values at step 670. Classification and/or prediction values may be evaluated at step 680 to determine whether such values have achieved a desired accuracy level. Performance of the predictive model may be evaluated in a number of ways based on a number of true positives, false positives, true negatives, and/or false negatives classifications of the plurality of data points indicated by the predictive model.

For example, the false positives of the predictive model may refer to a number of times the predictive model incorrectly classified an autonomous configuration change as anomalous that was in reality non-anomalous. Conversely, the false negatives of the predictive model may refer to a number of times the machine learning model classified one or more autonomous configuration changes as non-anomalous when, in fact, the one or more autonomous configuration changes were anomalous. True negatives and true positives may refer to a number of times the predictive model correctly classified one or more autonomous configuration changes as anomalous or non-anomalous. Related to these measurements are the concepts of recall and precision. Generally, recall refers to a ratio of true positives to a sum of true positives and false negatives, which quantifies a sensitivity of the predictive model. Similarly, precision refers to a ratio of true positives a sum of true and false positives. When such a desired accuracy level is reached, the training phase ends and the predictive model may be output at step 690; when the desired accuracy level is not reached, however, then a subsequent iteration of the training method 600 may be performed starting at step 610 with variations such as, for example, considering a larger collection of historical flight data.

As further described herein, the predictive model may be used to generate one or more probabilistic alert rules. For example, a probabilistic alert rule may be used to determine that one or more current flight attributes for an aircraft in-flight are indicative that a current autonomous configuration change was anomalous or non-anomalous. The probabilistic alert rule may further be used to determine that the one or more current flight attributes and/or the current autonomous configuration change are indicative of a next autonomous configuration change for one or more of the aircraft's automation functions. The probabilistic alert rule may be used by a computing device on-board the aircraft to make these determinations and to provide a probability that the current autonomous configuration change was anomalous or non-anomalous and a probability of a next autonomous configuration change for one or more of the aircraft's automation functions.

Figure 7:
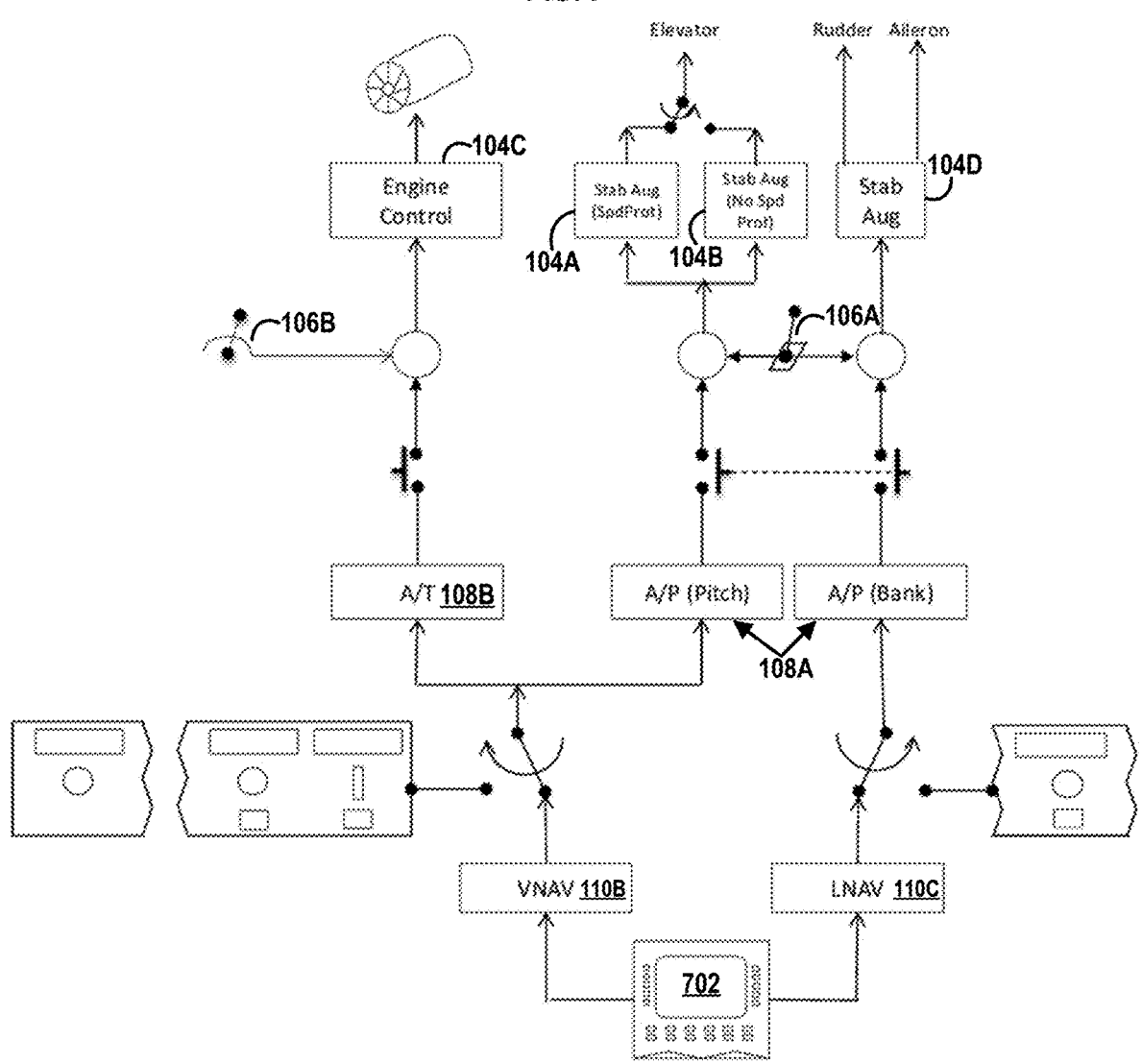
FIG. 7 shows an example system.

Turning now to FIG. 7, a wire-frame 700 of a synoptic flight deck automation function configuration (AFC) system is shown. The wire-frame 700 depicts the flow of information through the automation functions with "switches" for sources of targets and control modes, sources of commands, and for automated speed protection. It should be noted that the stick 106A and the throttle lever 106B are shown in the wire-frame 700 to indicate that a pitch, a roll, and/or a thrust command from the Autopilot 108A or the Autothrottle 108B may be overridden. A color code may be used to identify a source of targets and modes. For example, magenta may be used for VNAV, LNAV source; green may be used for MCP source; and white may be used for stick/rudder and throttle inputs. When a source is decoupled it may be grayed-out.

Turning now to FIG. 8, an example user interface at an Automation Function Configuration (AFC) system 800 is shown. The AFC system 800 may be configured according to the training method 600 and/or the wire-frame 700. For example, the AFC system 800 may include a computing device 702 onboard an aircraft. The computing device 702 may use the set of probabilistic alert rules described herein to provide the flight crew of the aircraft with information regarding various automation functions in an efficient, organized manner at a synoptic display (e.g., a graphical interface of the aircraft) as shown in FIG. 8. The computing device 702 may not provide an alert when a configuration change occurs. For example, when a configuration change occurs, an alert may be caused by the computing device 702 to "pop-up" on the synoptic display as if to say "Is this change what you wanted to happen? Click OK to Continue." If the configuration change was autonomous (e.g., not pilot selected), the sections of the synoptic display that changed may be caused by the computing device 702 to flash for an amount of time (e.g., 3 seconds). For example if VNAV transitions from engaged to not engaged, graphical objects in the synoptic display of the computing device 702 may change to magenta and may flash for 3 seconds. Likewise if the Autothrottle is disengaged, graphical objects in the synoptic display of the computing device 702 may change to gray and flash for 3 seconds. If the transition was pilot selected, the synoptic display of the computing device 702 may not cause any parts of the display to flash.

The synoptic display of the computing device 702 may be hidden when not providing an alert. Further, the synoptic display of the computing device 702 may return to a previous page/screen when the pilot touches the display or selects an "OK" button (e.g., to dismiss an alert). For example, pilot verification may be required only for autonomous configuration changes (e.g. an autonomous Autothrottle disconnect). When the pilot pushes a button (e.g. VNAV), the synoptic display of the computing device 702 may be displayed for 5 secs and then automatically return to the previous page/screen. The synoptic display of the computing device 702 may be displayed at any time by pilot selection.

The synoptic display of the computing device 702 may be used to provide one or more probabilities related to one or more of a current autonomous configuration change or a next autonomous configuration change. For example, the computing device 702 may receive flight data from the aircraft, which may include one more current flight attributes and an indication of a current autonomous configuration change. Using the flight data and the set of probabilistic alert rules described herein, the computing device 702 may determine a probability. For example, the probability may be indicative of a level of confidence that the current autonomous configuration change was erroneous (e.g., anomalous). As another example, the probability may be indicative of a level of confidence that the current autonomous configuration change was not erroneous (e.g., non-anomalous). As a further example, the probability may be indicative of a level of confidence that a next autonomous configuration change will occur in-flight (e.g., a probability that an automation function may engage or disengage during flight). The level of confidence that a next autonomous configuration change will occur in-flight may be based on the one more current flight attributes, the current autonomous configuration change, and/or the set of probabilistic alert rules. The computing device may cause each probability to be displayed at the synoptic display.

The synoptic display of the computing device 702 may display additional information for flight crew. For example, the synoptic display of the computing device 702 may display flight plan intentions, targets, and control modes and the commands. As shown in FIGS. 9A and 9B, the synoptic display of the computing device 702 may display one or more of a procedure, an active leg, a mode, a target, or a current control surface comment for a particular flight segment.

Figure 10:
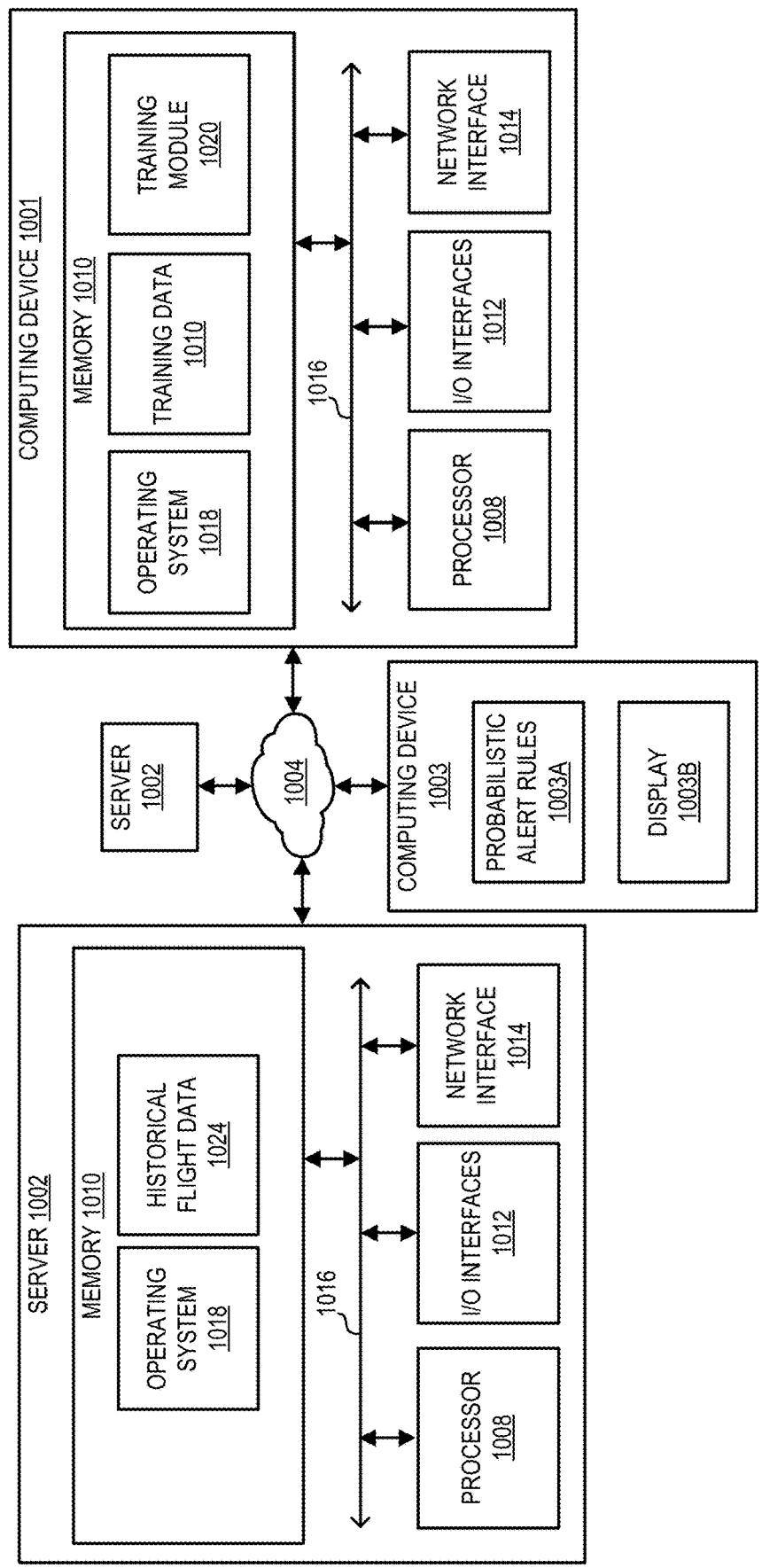
FIG. 10 shows an example system.

As discussed herein, the present methods and systems may be computer-implemented. FIG. 10 shows a block diagram depicting an environment 1000 comprising non-limiting examples of a computing device 1001 and a server 1002 connected through a network 1004. In an aspect, some or all steps of any described method may be performed on a computing device as described herein. The computing device 1001 can comprise one or multiple computers configured to store one or more of the training module 520, training data 510 (e.g., labeled autonomous configuration changes), and the like. The server 1002 can comprise one or multiple computers configured to store historical flight data 1024 (e.g., a plurality of historical flight records). Multiple servers 1002 can communicate with the computing device 1001 via the through the network 1004.

The computing device 1001 and the server 1002 can be a digital computer that, in terms of hardware architecture, generally includes a processor 1008, memory system 1010, input/output (I/O) interfaces 1012, and network interfaces 1014. These components (1508, 1010, 1012, and 1014) are communicatively coupled via a local interface 1016. The local interface 1016 can be, for example, but not limited to, one or more buses or other wired or wireless connections, as is known in the art. The local interface 1016 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1008 can be a hardware device for executing software, particularly that stored in memory system 1010. The processor 1008 can be any custom made or commercially available processor, a central processing unit (CPU), an auxiliary processor among several processors associated with the computing device 1001 and the server 1002, a semiconductor-based microprocessor (in the form of a microchip or chip set), or generally any device for executing software instructions. When the computing device 1001 and/or the server 1002 is in operation, the processor 1008 can be configured to execute software stored within the memory system 1010, to communicate data to and from the memory system 1010, and to generally control operations of the computing device 1001 and the server 1002 pursuant to the software.

The I/O interfaces 1012 can be used to receive user input from, and/or for providing system output to, one or more devices or components. User input can be provided via, for example, a keyboard and/or a mouse. System output can be provided via a display device and a printer (not shown). I/O interfaces 1012 can include, for example, a serial port, a parallel port, a Small Computer System Interface (SCSI), an infrared (IR) interface, a radio frequency (RF) interface, and/or a universal serial bus (USB) interface.

The network interface 1014 can be used to transmit and receive from the computing device 1001 and/or the server 1002 on the network 1004. The network interface 1014 may include, for example, a 10 BaseT Ethernet Adaptor, a 100 BaseT Ethernet Adaptor, a LAN PHY Ethernet Adaptor, a Token Ring Adaptor, a wireless network adapter (e.g., WiFi, cellular, satellite), or any other suitable network interface device. The network interface 1014 may include address, control, and/or data connections to enable appropriate communications on the network 1004.

The memory system 1010 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 1010 may incorporate electronic, magnetic, optical, and/or other types of storage media. Note that the memory system 1010 can have a distributed architecture, where various components are situated remote from one another, but can be accessed by the processor 1008.

The software in memory system 1010 may include one or more software programs, each of which comprises an ordered listing of executable instructions for implementing logical functions. In the example of FIG. 10, the software in the memory system 1010 of the computing device 1001 can comprise the training module 520 (or subcomponents thereof), the training data 520, and a suitable operating system (O/S) 1018. In the example of FIG. 10, the software in the memory system 1010 of the server 1002 can comprise, the historical flight data 1024, and a suitable operating system (O/S) 1018. The operating system 1018 essentially controls the execution of other computer programs and provides scheduling, input-output control, file and data management, memory management, and communication control and related services.

The environment 1000 may further comprise a computing device 1003. The computing device 1003 may be a computing device and/or system onboard an aircraft, such as the computing device 702. The computing device 1003 may use a set of probabilistic alert rules stored in a probabilistic alert rules module 1003A to provide flight crew of the aircraft with information regarding various automation functions in an efficient, organized manner at a synoptic display 1003B (e.g., a graphical interface of the aircraft). For example, the computing device 1003 may receive flight data from the aircraft, which may include one more current flight attributes and an indication of a current autonomous configuration change. Using the flight data and the set of probabilistic alert rules stored in the probabilistic alert rules module 1003A, the computing device 1003 may determine a probability. For example, the probability may be indicative of a level of confidence that the current autonomous configuration change was erroneous. As another example, the probability may be indicative of a level of confidence that a next autonomous configuration change will occur in-flight. The computing device 1003 may cause the probability and an indication of the current autonomous configuration change to be displayed at the synoptic display 1003B.

For purposes of illustration, application programs and other executable program components such as the operating system 1018 are illustrated herein as discrete blocks, although it is recognized that such programs and components can reside at various times in different storage components of the computing device 1001 and/or the server 1002. An implementation of the training module 520 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Turning now to FIG. 11, a flowchart of an example method 1100 for improving aircraft safety in-flight is shown. The method 1100 may be performed in whole or in part by a single computing device, a plurality of computing devices, and the like. For example, the training module 520, the computing device 702, and/or the computing device 1003 may be configured to perform the method 1100.

At step 1110, a computing device may receive historical flight data. The historical flight data may include a plurality of flight records. Each flight record of the plurality of flight records may be associated with a controlled flight into stall incident. Further, each flight record of the plurality of flight records may include a plurality of flight attributes. The plurality of flight attributes may include, an airspeed, a groundspeed, an amount of pitch, a level of thrust, a phase of flight, a command(s), a target(s), VNAV data, LNAV data, a pilot selection(s) a combination thereof and/or the like. At step 1120, the computing device may determine one or more flight attributes associated with at least one autonomous configuration change. The at least one autonomous configuration change may be associated with one or more of an autopilot system, an autothrottle system, or a flight guidance system. The computing device may determine the one or more flight attributes associated with the at least one autonomous configuration change based on the plurality of flight attributes for each flight record of the plurality of flight records. Alternatively, or in addition, the computing device may determine the one or more flight attributes associated with the at least one autonomous configuration change based on one or more machine learning models and/or algorithms.

For example, the computing device may utilize the one or more machine learning models and/or algorithms to determine which flight attributes are most closely associated with the at least one autonomous configuration change. Using those closely associated flight attributes, the computing device may generate a predictive model. The predictive model (e.g., a machine learning classifier) may be generated to classify an autonomous configuration change as anomalous or non-anomalous based on analyzing flight data associated with the autonomous configuration change.

At step 1130, the computing device may use the predictive model to generate a plurality of probabilistic alert rules. For example, the computing device may use the predictive model to generate the plurality of probabilistic alert rules based on the one or more flight attributes associated with the at least one autonomous configuration change. A probabilistic alert rule may be used to determine that one or more current flight attributes are indicative that the at least one autonomous configuration change was anomalous or non-anomalous. The probabilistic alert rule may further be used to determine that the one or more current flight attributes and/or the current autonomous configuration change are indicative of a next autonomous configuration change for one or more of the aircraft's automation functions. The probabilistic alert rule may be used by a computing device to make these determinations and to provide a probability that the current autonomous configuration change was anomalous or non-anomalous and a probability of a next autonomous configuration change for one or more of the aircraft's automation functions. For example, the computing device may cause an alert to be provided at a graphical interface of the aircraft indicating the probability.

Turning now to FIG. 12, a flowchart of an example method 1200 for improving aircraft safety in-flight is shown. The method 1200 may be performed in whole or in part by a single computing device, a plurality of computing devices, and the like. For example, the training module 520, the computing device 702, and/or the computing device 1003 may be configured to perform the method 1200.

At step 1210, a computing device may receive flight data for an aircraft in-flight. The flight data include a plurality of flight attributes. The flight data may also include an indication of a current autonomous configuration change. The current autonomous configuration change may be associated with one or more of an autopilot system, an autothrottle system, or a flight guidance system of the aircraft.

At step 1220, the computing device may determine a probability that the current autonomous configuration change was erroneous (e.g., anomalous). The computing device may determine the probability based on the plurality of flight attributes and at least one of a plurality of probabilistic alert rules. The plurality of probabilistic alert rules may be stored on the computing device in memory. The computing device, or another computing device, may have generated the plurality of probabilistic alert rules as part of a machine learning process.

For example, the computing device may receive historical flight data. The historical flight data may include a plurality of flight records. Each flight record of the plurality of flight records may be associated with a controlled flight into stall incident. Further, each flight record of the plurality of flight records may include a plurality of flight attributes. The plurality of flight attributes may include an altitude, an airspeed, a groundspeed, an amount of pitch, a level of thrust, a phase of flight, a command(s), a target(s), VNAV data, LNAV data, a pilot selection(s) a combination thereof and/or the like. The computing device may determine one or more flight attributes associated with at least one autonomous configuration change. The at least one autonomous configuration change may be associated with one or more of an autopilot system, an autothrottle system, or a flight guidance system. The computing device may determine the one or more flight attributes associated with the at least one autonomous configuration change based on the plurality of flight attributes for each flight record of the plurality of flight records. Alternatively, or in addition, the computing device may determine the one or more flight attributes associated with the at least one autonomous configuration change based on one or more machine learning models and/or algorithms.

The computing device may utilize the one or more machine learning models and/or algorithms to determine which flight attributes are most closely associated with the at least one autonomous configuration change. Using those closely associated flight attributes, the computing device may generate a predictive model. The predictive model (e.g., a machine learning classifier) may be generated to classify an autonomous configuration change as anomalous or non-anomalous based on analyzing flight data associated with the autonomous configuration change. The computing device may use the predictive model to generate the plurality of probabilistic alert rules. For example, the computing device may use the predictive model to generate the plurality of probabilistic alert rules based on the one or more flight attributes associated with the at least one autonomous configuration change. A probabilistic alert rule may be used to determine that one or more current flight attributes are indicative that the current autonomous configuration change was anomalous or non-anomalous. The probabilistic alert rule may further be used to determine that one or more current flight attributes and/or the current autonomous configuration change are indicative of a next autonomous configuration change for one or more of the aircraft's automation functions. The probabilistic alert rule may be used by a computing device to make these determinations and to provide a probability that the current autonomous configuration change was anomalous or non-anomalous and a probability of a next autonomous configuration change for one or more of the aircraft's automation functions.

For example, at step 1230, the computing device may cause an alert to be provided at a graphical interface of onboard the aircraft indicating the probability that the current autonomous configuration change was anomalous or non-anomalous. The alert may comprise an indication that the current autonomous configuration change is associated with one or more of the autopilot system, the autothrottle system, or the flight guidance system. The alert may further comprise an indication that the next autonomous configuration change is associated with one or more of the autopilot system, the autothrottle system, or the flight guidance system. The probability may be indicative of a level of confidence that the current autonomous configuration change was erroneous (e.g., anomalous). As another example, the probability may be indicative of a level of confidence that the current autonomous configuration change was not erroneous (e.g., non-anomalous). As a further example, the probability may be indicative of a level of confidence that the next autonomous configuration change will occur in-flight (e.g., a probability that an automation function may engage or disengage during flight). The level of confidence that the next autonomous configuration change will occur in-flight may be based on the one more current flight attributes, the current autonomous configuration change, and/or the set of probabilistic alert rules.

Turning now to FIG. 13, a flowchart of an example method 1300 for improving aircraft safety in-flight is shown. The method 1300 may be performed in whole or in part by a single computing device, a plurality of computing devices, and the like. For example, the training module 520, the computing device 702, and/or the computing device 1003 may be configured to perform the method 1300. At step 1310

At step 1310, a computing device may receive flight data for an aircraft in-flight. The flight data include a plurality of flight attributes. The flight data may also include an indication of a current autonomous configuration change. The current autonomous configuration change may be associated with one or more of an autopilot system, an autothrottle system, or a flight guidance system of the aircraft.

At step 1320, the computing device may determine a probability that the current autonomous configuration change was erroneous (e.g., anomalous). The computing device may determine the probability based on the plurality of flight attributes and at least one of a plurality of probabilistic alert rules. The plurality of probabilistic alert rules may be stored on the computing device in memory. The computing device, or another computing device, may have generated the plurality of probabilistic alert rules as part of a machine learning process.

For example, the computing device may receive historical flight data. The historical flight data may include a plurality of flight records. Each flight record of the plurality of flight records may be associated with a controlled flight into stall incident. Further, each flight record of the plurality of flight records may include a plurality of flight attributes. The plurality of flight attributes may include an altitude, an airspeed, a groundspeed, an amount of pitch, a level of thrust, a phase of flight, a command(s), a target(s), VNAV data, LNAV data, a pilot selection(s) a combination thereof and/or the like. The computing device may determine one or more flight attributes associated with at least one autonomous configuration change. The at least one autonomous configuration change may be associated with one or more of an autopilot system, an autothrottle system, or a flight guidance system. The computing device may determine the one or more flight attributes associated with the at least one autonomous configuration change based on the plurality of flight attributes for each flight record of the plurality of flight records. Alternatively, or in addition, the computing device may determine the one or more flight attributes associated with the at least one autonomous configuration change based on one or more machine learning models and/or algorithms.

The computing device may utilize the one or more machine learning models and/or algorithms to determine which flight attributes are most closely associated with the at least one autonomous configuration change. Using those closely associated flight attributes, the computing device may generate a predictive model. The predictive model (e.g., a machine learning classifier) may be generated to classify an autonomous configuration change as anomalous or non-anomalous based on analyzing flight data associated with the autonomous configuration change. The computing device may use the predictive model to generate the plurality of probabilistic alert rules. For example, the computing device may use the predictive model to generate the plurality of probabilistic alert rules based on the one or more flight attributes associated with the at least one autonomous configuration change. A probabilistic alert rule may be used to determine that one or more current flight attributes are indicative that the current autonomous configuration change was anomalous or non-anomalous. The probabilistic alert rule may further be used to determine that one or more current flight attributes and/or the current autonomous configuration change are indicative of a next autonomous configuration change for one or more of the aircraft's automation functions. The probabilistic alert rule may be used by a computing device to make these determinations and to provide a probability that the current autonomous configuration change was anomalous or non-anomalous and a probability of a next autonomous configuration change for one or more of the aircraft's automation functions.

For example, at step 1330, the computing device may cause an alert to be provided at a graphical interface of onboard the aircraft indicating the probability that the next autonomous configuration change for one or more of the aircraft's automation functions will occur in-flight. The alert may comprise an indication that the next autonomous configuration change is associated with one or more of the autopilot system, the autothrottle system, or the flight guidance system. The alert may further comprise an indication that the current autonomous configuration change is associated with one or more of the autopilot system, the autothrottle system, or the flight guidance system. The probability may be indicative of a level of confidence that the current autonomous configuration change was erroneous (e.g., anomalous). As another example, the probability may be indicative of a level of confidence that the current autonomous configuration change was not erroneous (e.g., non-anomalous). As a further example, the probability may be indicative of a level of confidence that the next autonomous configuration change will occur in-flight (e.g., a probability that an automation function may engage or disengage during flight). The level of confidence that the next autonomous configuration change will occur in-flight may be based on the one more current flight attributes, the current autonomous configuration change, and/or the set of probabilistic alert rules.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
   receiving, at a computing device, historical flight data for a plurality of flight records, wherein each flight record of the plurality of flight records comprises a plurality of flight attributes;
   determining, based on the plurality of flight attributes for each flight record of the plurality of flight records and a machine learning model, one or more flight attributes associated with at least one autonomous configuration change; and
   generating, based on the one or more flight attributes associated with the at least one autonomous configuration change, a plurality of probabilistic alert rules.

2. The method of claim 1, wherein each flight record of the plurality of flight records is associated with a controlled flight into stall incident.

3. The method of claim 1, wherein the at least one autonomous configuration change is associated with one or more of an autopilot system, an autothrottle system, or a flight guidance system.

4. The method of claim 1, further comprising receiving current flight data for an aircraft in-flight, wherein the current flight data comprises a second plurality of flight attributes and an indication of a current autonomous configuration change.

5. The method of claim 4, further comprising causing, based on the indication of the current autonomous configuration change, an alert to be provided at a graphical interface of the aircraft in-flight.

6. The method of claim 4, further comprising determining, based on the second plurality of flight attributes and the plurality of probabilistic alert rules, a probability that the current autonomous configuration change was erroneous.

7. The method of claim 4, further comprising determining, based on the second plurality of flight attributes and the plurality of probabilistic alert rules, a probability that a next autonomous configuration change will occur.

8. A method comprising:
   receiving, at a computing device, flight data for an aircraft in-flight, wherein the flight data comprises a plurality of flight attributes and an indication of a current autonomous configuration change;
   determining, based on the plurality of flight attributes and at least one of a plurality of probabilistic alert rules, a probability that the current autonomous configuration change was erroneous; and
   causing an alert comprising the probability to be provided at a graphical interface of the aircraft in-flight.

9. The method of claim 8, wherein the current autonomous configuration change is associated with one or more of an autopilot system, an autothrottle system, or a flight guidance system.

10. The method of claim 9, wherein the alert comprises an indication that the current autonomous configuration change is associated with one or more of the autopilot system, the autothrottle system, or the flight guidance system.

11. The method of claim 8, further comprising receiving historical flight data for a plurality of flight records, wherein each flight record of the plurality of historical flight records comprises a plurality of historical flight attributes.

12. The method of claim 11, further comprising determining, based on the plurality of historical flight attributes for each flight record of the plurality of flight records and a machine learning model, one or more historical flight attributes associated with the current autonomous configuration change.

13. The method of claim 12, further comprising generating, based on the one or more historical flight attributes associated with the current autonomous configuration change, the plurality of probabilistic alert rules.

14. The method of claim 13, wherein each flight record of the plurality of historical flight records is associated with a controlled flight into stall incident.

15. A method comprising:
   receiving, at a computing device, flight data for an aircraft in-flight, wherein the flight data comprises a plurality of flight attributes and an indication of a current autonomous configuration change;
   determining, based on the flight data and at least one of a plurality of probabilistic alert rules, a probability that a next autonomous configuration change will occur in-flight; and
   causing an alert comprising the probability to be provided at a graphical interface of the aircraft in-flight.

16. The method of claim 15, wherein the current autonomous configuration change is associated with one or more of an autopilot system, an autothrottle system, or a flight guidance system.

17. The method of claim 15, wherein the alert comprises an indication that the next autonomous configuration change is associated with one or more of an autopilot system, an autothrottle system, or a flight guidance system.

18. The method of claim 15, further comprising receiving historical flight data for a plurality of flight records, wherein each flight record of the plurality of historical flight records comprises a plurality of historical flight attributes and is associated with a controlled flight into stall incident.

19. The method of claim 18, further comprising determining, based on the plurality of historical flight attributes for each flight record of the plurality of flight records and a machine learning model, one or more historical flight attributes associated with the next autonomous configuration change.

20. The method of claim 19, further comprising generating, based on the one or more historical flight attributes associated with the next autonomous configuration change, the plurality of probabilistic alert rules.

* * * * *